United States Patent [19]
Berrend

[11] Patent Number: 6,149,037
[45] Date of Patent: Nov. 21, 2000

[54] ADAPTER FOR REPLACEABLE LUBRICANT STORAGE CARTRIDGE

[75] Inventor: Richard E. Berrend, New Holstein, Wis.

[73] Assignee: Lube Devices, Inc., Manitowoc, Wis.

[21] Appl. No.: 09/129,817

[22] Filed: Aug. 6, 1998

[51] Int. Cl.$^7$ ................................................. B65D 88/54
[52] U.S. Cl. ..................... 222/326; 285/148.23; 285/353; 184/38.1; 222/368
[58] Field of Search ..................................... 285/353, 384, 285/148.23; 222/368, 326, 327; 184/38.1; 141/383

[56] References Cited

U.S. PATENT DOCUMENTS

| | | | |
|---|---|---|---|
| 188,213 | 3/1877 | Weiss | 285/384 |
| 269,626 | 12/1882 | Bodel et al. | 285/353 |
| 541,775 | 6/1895 | Naegeli | 285/384 |
| 954,177 | 4/1910 | Fleming | 285/353 |
| 960,667 | 6/1910 | Miller | 285/353 |
| 965,704 | 7/1910 | Golberg | 285/353 |
| 2,123,712 | 7/1938 | Clark | 184/38.1 |
| 2,503,169 | 4/1950 | Phillips | 285/353 |
| 2,926,027 | 2/1960 | Marquis | 285/353 |
| 3,121,516 | 2/1964 | Dewees et al. | 222/326 |
| 3,400,865 | 9/1968 | Hester | 222/368 |
| 4,869,403 | 9/1989 | Brüning | 222/327 |

*Primary Examiner*—Eric K. Nicholson
*Attorney, Agent, or Firm*—Nilles & Nilles, S.C.

[57] ABSTRACT

A lubricant transfer device such as a lubricant metering device is provided that includes a lubricant dispenser that can use a standard replaceable lubricant storage cartridge as a lubricant source. The dispenser includes an adapter that is configured for mounting on a lubricant metering pump or the like and that can selectively receive the standard storage cartridge. The adapter permits the coupling of the storage cartridge to the pump so as to prevent unintended axial movement of the storage cartridge with respect to the pump and so as to provide an air-tight seal between the storage cartridge and the adapter, thereby permitting lubricant to be drawn out of the storage cartridge under negative pressure generated by operation of the pump. The adapter preferably includes an adapter body mounted over an inlet of the pump and a retaining ring that screws into the adapter body so as to clamp a bead, extending around a rim at the bottom axial end of the storage cartridge, between the retaining ring and the adapter body. A seal, preferably taking the form of an annular gasket compressed between the bottom end of the storage cartridge and an upwardly facing annular surface of the adapter body, prevents air from leaking past the adapter and into the storage cartridge. The storage container may additionally include a position indicator for providing an indication of the lubricant level within the storage cartridge.

1 Claim, 3 Drawing Sheets

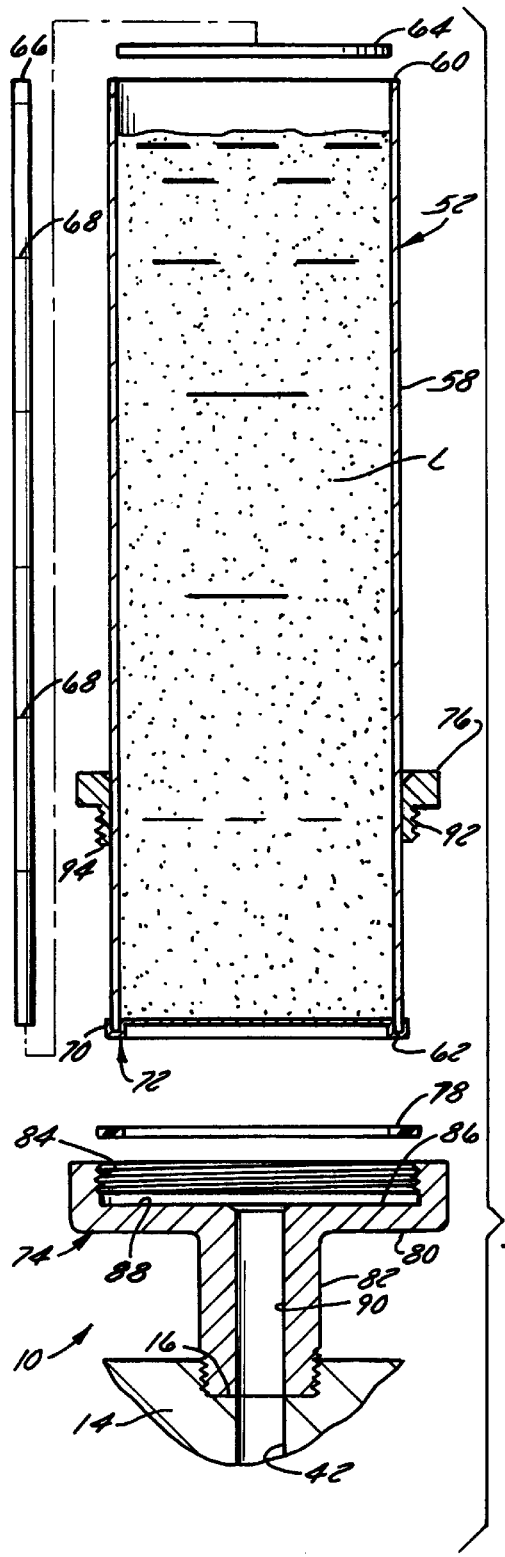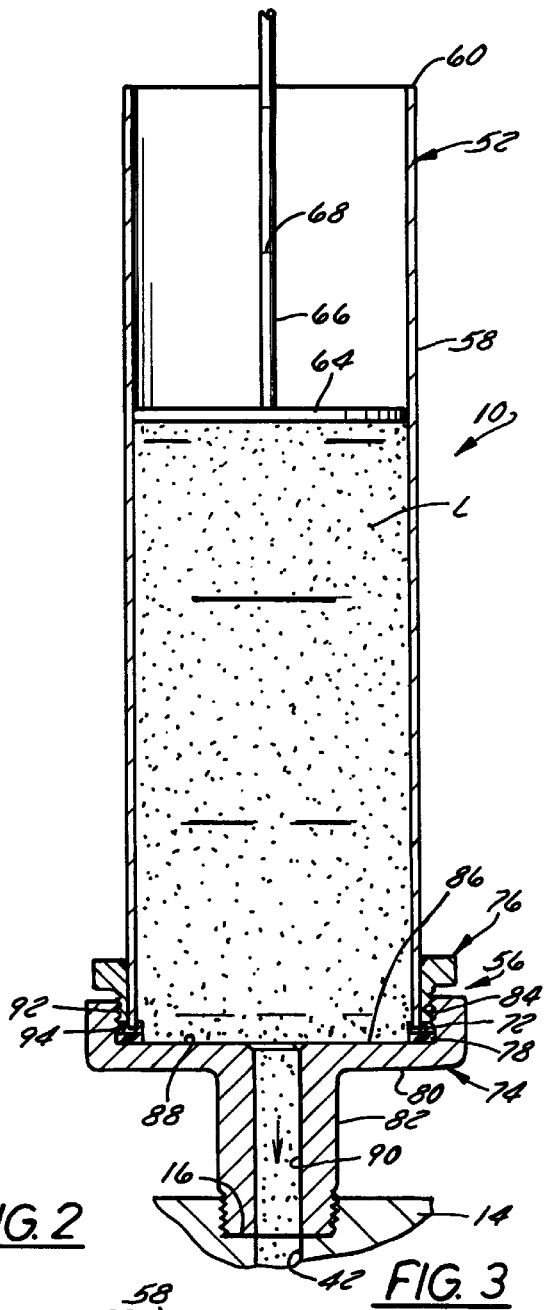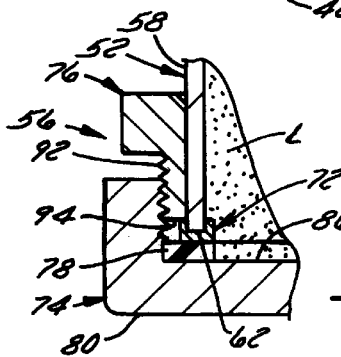

ADAPTER FOR REPLACEABLE LUBRICANT STORAGE CARTRIDGE

BACKGROUND OF THE INVENTION

1. Field of the Invention

The invention relates to metering devices or other lubricant transfer devices that rely on a negative pressure to remove lubricant from a source. More particularly, the invention relates to an adapter permitting the use of a standard lubricant storage cartridge in a lubricant dispenser of such a lubricant transfer device. The invention also relates to an improved method of mounting a replaceable lubricant storage cartridge on a lubricant transfer device and of replacing the thus-mounted storage cartridge.

2. Discussion of the Related Art

A variety of systems employ a transfer device which draws lubricant from a source using a negative pressure, i.e., at least a partial vacuum. The transferred lubricant may comprise grease, oil, or any other liquid or semi-liquid lubricant. A common example of such a transfer device is a lubricant metering device.

Lubricant metering devices are well-known for the precision feeding of lubricant to downstream equipment for lubrication purposes. The typical metering device includes, inter alia, a source and a lubricant metering pump that receives lubricant from the source and that pumps the lubricant to an outlet of the metering device for transfer to downstream equipment. The typical metering pump includes a reciprocating piston that passes through a supply chamber and into a metering chamber. Lubricant is drawn into the supply chamber from the source by way of a negative pressure or partial vacuum generated upon piston movement. A metering device of this general type is disclosed, for example, in co-pending U.S. patent application Ser. No. 08/987,595 (the '595 application), Lukas et al., filed on Dec. 9, 1997, now U.S. Pat. No. 5,876,189, issued Mar. 2, 1999, and assigned to a common assignee, the subject matter of which is hereby incorporated by reference.

The lubricant source for the typical lubricant metering device comprises either 1) a permanent reservoir or 2) a rather complex assembly of a housing and a reciprocating piston. Permanent reservoir-type containers must be periodically filled using a grease gun or the like at substantial operator inconvenience and risk of spills. Housing assemblies can be filled more easily, but must be at least partially disassembled in a time consuming task that itself risks spills.

Replaceable lubricant storage cartridges are well known in other lubricant dispensing applications. The typical storage cartridge of this type is designed for use with a grease gun or some other device that employs a mechanically-driven piston to force the lubricant out of the storage cartridge. Storage cartridges of this type are disclosed, for example, in U.S. Pat. No. 3,121,516 to Dewees et al. (Dewees) and U.S. Pat. No. 4,869,403 to Bruning (Bruning).

Unfortunately, the storage cartridges disclosed in the Dewees patent and the Bruning patent as well as other, similar storage cartridges are incompatible for use with conventional metering devices for several reasons. For instance, a typical grease gun forces grease out of one end of the storage cartridge by mechanically driving a piston through the storage cartridge from the opposite end. The grease gun therefore is designed for attachment to the storage cartridge primarily at the storage cartridge's opposite end. The typical metering device cannot receive a storage cartridge in this manner. Moreover, the typical arrangement for attaching a storage cartridge to a grease gun does not need to form an air-tight seal at the interface between the storage cartridge and the grease gun because dispensing occurs under mechanical pressure rather than under a partial vacuum or negative air pressure.

The need has therefore arisen to adapt a standard lubricant storage cartridge for use with a lubricant metering device or the like.

OBJECTS AND SUMMARY OF THE INVENTION

It is therefore a first principal object of the invention to provide an adapter that permits the use of readily available and easily-replaceable lubricant storage cartridges in a lubricant transfer device such as lubricant metering device.

Another object of the invention is to provide an adapter that meets the first principal object and that is simple and easy to use.

In accordance with a first aspect of the invention, these objects are achieved by providing an adapter including an adapter body and a retainer. The adapter body is configured for attachment to the transfer device and has 1) a first clamping surface and 2) a bore formed therethrough which is configured to communicate with the inlet of the transfer device when the adapter body is attached to the transfer device. The retainer is configured to surround the tubular body of the storage cartridge and is configured for attachment to the adapter body. The retainer has a second clamping surface which is configured to face and to apply clamping forces to the bead of the storage cartridge when the retainer is attached to the adapter body, thereby preventing detachment of the storage cartridge from the transfer device.

Preferably, the adapter body has 1) an upper cup-shaped portion having a) an internally threaded tubular body b) and a lower annular end which presents an upwardly facing annular surface forming the first clamping surface, and 2) a lower tubular portion which extends downwardly from the lower annular end of the cup-shaped portion and which is configured for connection to the transfer device in the vicinity of the inlet of the transfer device.

The retainer preferably comprises a retaining ring which is configured to surround the storage cartridge and to screw into the tubular body of the cup-shaped portion.

Still another object of the invention is to provide an adapter that meets the first principal object and that provides an air-tight seal between the adapter and the storage cartridge so as to permit lubricant dispensing under negative pressure generated by the lubricant transfer device.

In accordance with another aspect of the invention, this object is achieved by providing a gasket which is configured to engage and compress against an axial surface of the bead when the retainer is attached to the adapter body, thereby forming an air-tight seal between the storage cartridge and the adapter.

A second principal object of the invention is to provide a lubricant dispenser that dispenses lubricant under a negative pressure and that permits quick-replacement of a standard tubular lubricant storage cartridge.

In accordance with another aspect of the invention, this object is achieved by providing a dispenser that includes 1) a storage cartridge and 2) an adapter which is configured as described above in connection with the first aspect and which clamps the storage cartridge in place.

If desired, the dispenser may include an indicator which provides a visual indication of lubricant level within the storage cartridge. The indicator preferably comprises 1) a follower disk which slides axially downwardly within the tubular body of the storage cartridge as lubricant is dispensed from the storage cartridge, and 2) an indicator rod which is attached to the follower disk and which extends axially upwardly from the follower disk to a position beyond the upper end of the tubular body of the storage cartridge.

A third principal object of the invention is to provide a lubricant metering device that reliably feeds lubricant to downstream equipment from a standard replaceable lubricant storage cartridge and that permits easy replacement of a spent storage cartridge.

In accordance with still another aspect of the invention, this object is achieved by providing a lubricant metering device having a lubricant metering pump and having a lubricant dispenser of the type described above in conjunction with the second principal object.

A fourth principal object of the invention is to provide an improved method of coupling a standard replaceable lubricant storage cartridge to a fluid transfer device.

In accordance with still another aspect of the invention, this object is achieved by 1) mounting an adapter body of an adapter over an inlet of a lubricant transfer device, the adapter body having an upwardly facing clamping surface, 2) placing a tubular lubricant storage cartridge in a position in which a bottom axial end of the storage cartridge abuts the upwardly facing clamping surface, and 3) clamping a peripheral bead of the storage cartridge to an axial surface of the adapter, thereby preventing removal of the storage cartridge from the transfer device. Lubricant can then be dispensed from the bottom axial end of the storage cartridge, through the adapter, and into the inlet of the transfer device.

Another object of the invention is to provide a method that meets the fourth principal object and that provides an air-tight seal between the storage cartridge and the adapter so as to permit lubricant to be dispensed under a negative pressure generated by the lubricant transfer device.

Preferably, the sealing step comprises compressing an annular gasket between the bottom axial end of the storage cartridge and the upwardly facing clamping surface of the adapter body.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which:

FIG. 2 is a partially exploded sectional elevation view of a portion of the metering device of FIG. 1 and of the associated lubricant dispenser;

FIG. 3 corresponds to FIG. 2 and illustrates the lubricant dispenser in its assembled state;

FIG. 4 is an enlarged fragmentary view, in section, of a portion of the lubricant dispenser of FIG. 3;

DETAILED DESCRIPTION OF THE PREFERRED EMBODIMENTS

1. Resume

Pursuant to the invention, a lubricant transfer device such as a lubricant metering device is provided that includes a lubricant dispenser that can use a standard replaceable lubricant storage cartridge as a lubricant source. The dispenser includes an adapter that is configured for mounting on a lubricant metering pump or the like and that can selectively receive the standard storage cartridge. The adapter permits the coupling of the storage cartridge to the pump so as to prevent unintended axial movement of the storage cartridge with respect to the pump and so as to provide an air-tight seal between the storage cartridge and the adapter, thereby permitting lubricant to be drawn out of the storage cartridge under negative pressure generated by operation of the pump. The adapter preferably includes an adapter body mounted over an inlet of the pump and a retaining ring that screws into the adapter body so as to clamp a bead, extending around a rim at the bottom axial end of the storage cartridge, between the retaining ring and the adapter body. A seal, preferably taking the form of an annular gasket compressed between the bottom end of the storage cartridge and an upwardly facing annular surface of the adapter body, prevents air from leaking past the adapter and into the storage cartridge. The storage container may additionally include a position indicator for providing an indication of the lubricant level within the storage cartridge.

2. Construction of Lubricant Dispenser

Figure 1:
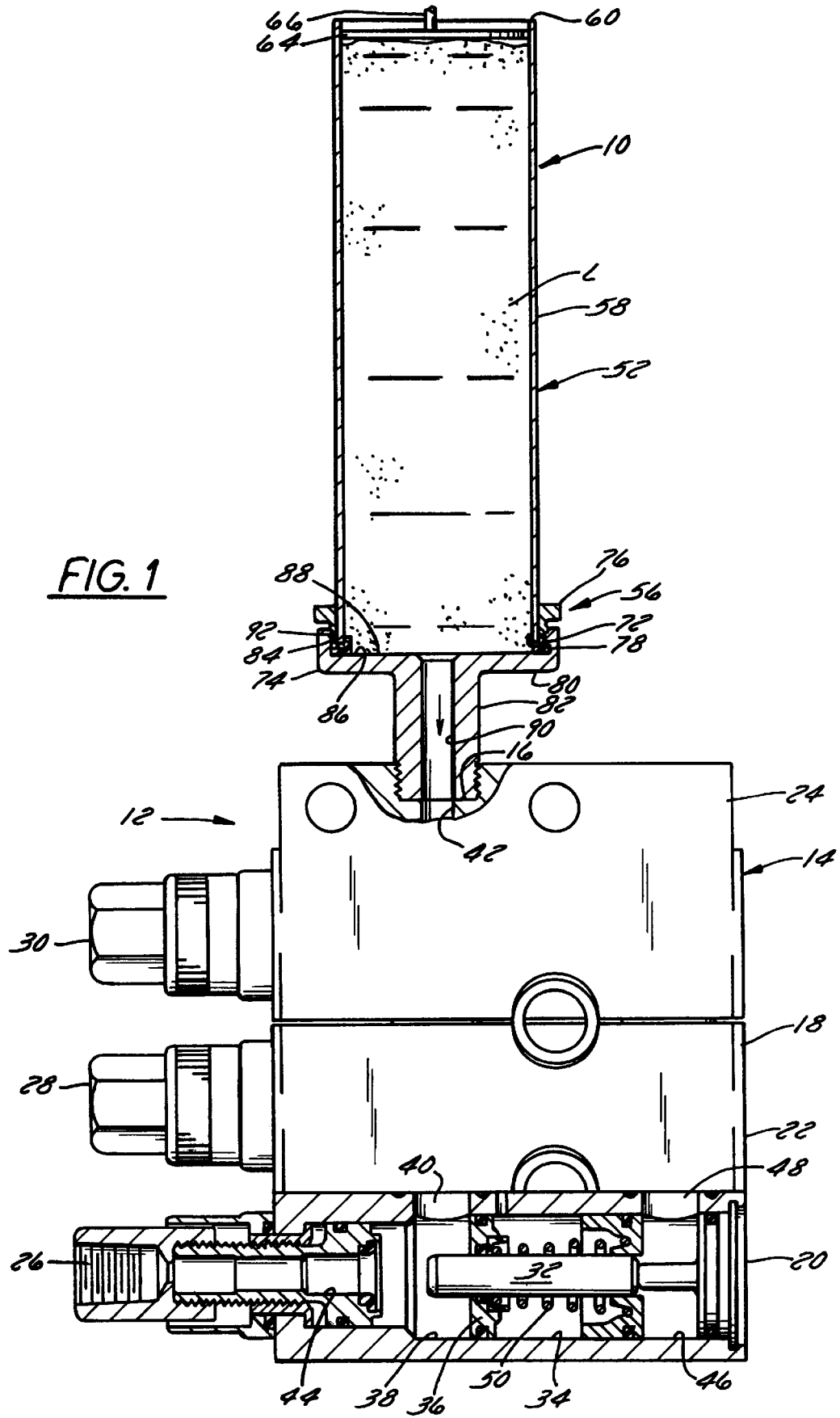
FIG. 1 is a partial fragmentary view of a lubricant metering device employing a lubricant dispenser constructed in accordance with a first preferred embodiment of the invention.

Referring now to FIGS. 1–4 and initially to FIG. 1 in particular, a lubricant dispenser 10 constructed in accordance with a first preferred embodiment of the invention is shown as part of a lubricant metering device 12, it being understood that the inventive dispenser 10 is usable with other lubricant transfer devices as well. The metering device 12 includes 1) the lubricant dispenser 10 and 2) a metering pump 14 that receives lubricant from the lubricant dispenser 10 on an on-demand basis. The lubricant may comprise oil, grease, or any other liquid or semi-liquid lubricant.

The illustrated lubricant dispenser 10 extends upwardly from an inlet 16 in the metering pump 14. The terms "upwardly" and "downwardly" therefore are used herein and in the claims for the sake of convenience. However, depending upon the orientation of the inlet 16, the lubricant dispenser 10 could extend horizontally or even downwardly and still operate. Hence, the terms "upwardly" and "downwardly" should be construed herein and in the claims to be at least essentially synonymous with "axially" and should not be construed to require a particular direction of extension relative to a horizontal plane. Directional terms such as "top" and "bottom" should similarly be construed broadly.

The metering pump 14 may comprise any device which is configured to draw lubricant into its inlet 16 under negative pressure (i.e., under a partial or complete vacuum) and to discharge the lubricant from one or more outlets thereof in controlled quantities. The pump 14 could be driven mechanically, electrically, or fluidically. The illustrated pump 14 does not, per se, form part of the present invention. It therefore will be discussed only briefly and primarily by way of its operation. Those interested in a more thorough understanding of the nuances of the pump's construction and operation should refer to the above-mentioned '595 application which, as discussed above, is incorporated herein by reference.

Pump 14 is a multi-piston pump having a multi-body housing 18 divided into several (three in this embodiment) modular valve bodies 20, 22, and 24 connected to one another as described in commonly assigned and co-pending patent application Ser. No. 08/989,531, now U.S. Pat. No. 5,881,773, issued March 16, 1999, the subject matter of which is hereby incorporated by reference. Disposed in the housing 18 are the aforementioned inlet 16, multiple outlets 26, 28, and 30, and a plurality of pistons, each of which is associated with a respective outlet. Only the piston 32 associated with the outlet 26 is shown in body 20 for the sake of convenience, it being understood that the remaining pistons in the other bodies 22 and 24 are identical to the piston 32.

The piston 32 is slidably and sealingly mounted in a cylinder 34 in the housing 18, and is guided in the cylinder 34 by a fixed guide 36 having a quad-ring flexible seal. A lubricant supply chamber 38 is located intermediate the length of the cylinder 34. Lubricant is supplied to the supply chamber 38 from an inlet passage 40 that extends through the housing 18 from an inlet bore 42 terminating at the lubricant inlet 16. The piston 32 also is movable into a metering chamber 44 disposed beneath the supply chamber 38. In the illustrated embodiment, the piston 32 is urged downwardly by compressed air or another actuating medium which is fed into an upper pressurizable chamber 46 from an air supply passage 48 coupled to a compressed air inlet (not shown) in the housing 18.

In use, compressed air or the like is delivered to pressurizable chamber 46 to drive the piston 32 downwardly against the force of a return spring 50. This movement creates at least a partial vacuum in the supply chamber 38 while retracting from 44 to draw lubricant into the supply chamber 38 via inlet passage 40, the inlet port 16, and the lubricant dispenser 10 as described in more detail below. Downward movement of the piston 32 into the metering chamber 44 forces a precisely controlled quantity of lubricant out of the fluid outlet 26 for conveyance to downstream equipment.

Referring now to FIGS. 1–4, the lubricant dispenser 10 includes as its principal components 1) a lubricant storage cartridge 52 and 2) an adapter 56. Each of these components will now be detailed in turn.

The lubricant storage cartridge 52 may comprise any tubular structure filled with a lubricant and having an outlet opening at one end (hereafter the bottom end). The illustrated and preferred lubricant storage cartridge is a readily available, off-the-shelf replaceable cylindrical cartridge having a storage capacity of anywhere from two ounces or less to twelve ounces or more. The illustrated cartridge comprises a tubular body 58 having an upper axial end 60 and a bottom axial end 62. The body 58 may be formed from paper, metal or any other lubricant and-air impervious material. The bottom axial end 62 is at least selectively open to form an outlet. The upper axial end 60 is covered to prevent egress of lubricant or ingress of dirt or other debris. The cover may take the form of a fixed cap or may take the form of a movable follower disk 64 as illustrated. The illustrated follower disk 64 is mounted in the body 58 so as to rest on top of lubricant L stored in the cartridge 52 and to move downwardly within the body 58 as lubricant is dispensed, thereby "following" the level of lubricant L within the cartridge 52. An indicator rod 66 is attached to the top of the follower disk 64 to provide an indication of lubricant level in the storage cartridge 52. Suitable indicia 68 may, if desired, be printed, etched, or otherwise provided on the indicator rod 66 to help provide an indication of the lubricant level within the storage cartridge 52.

Some structure should be provided on the storage cartridge 52 to permit the clamping of the cartridge 52 to the adapter 56 so as to prevent unintended removal of the storage cartridge 52 from the adapter 56. This structure preferably takes the form of a peripheral bead 70 that projects radially outwardly from the periphery of the tubular body 58 of the storage cartridge 52 so as to be engageable by at least one clamping surface of the adapter 56 as described in more detail below. The bead 70 can advantageously be formed from a conventional rim 72 of an off-the-shelf storage cartridge. That is, many commercially-available storage cartridges employ a pull tab-type removable metal cap. As is known in the art, the typical cap of this type is crimped onto the bottom end 62 of the tubular body 58 by the manufacturer to seal the lubricant in the storage cartridge 52. The user opens the cartridge 52 by grabbing the pull tab and removing the central portion of the metal cap from the cartridge 52, thereby leaving a U-shaped rim 72 on the bottom axial end 62 of the tubular body 58 as seen in FIGS. 2–4. As best seen in FIG. 4, he radial outer leg of this rim 72 forms the above-mentioned bead 70.

The adapter 56 performs several functions. First, at least a portion of it is permanently or semi-permanently attached to the metering pump 14 so as not to require disassembly of the entire adapter 56 during every storage cartridge replacement operation. Second, it is simple to fabricate and use. Third, when in its assembled state, it limits or even prevents unintended axial movement of the storage cartridge 52 relative to the pump 14 and, hence, prevents unintended removal of the storage cartridge 52 from the metering device 12. Fourth, it provides an air-tight seal with the storage cartridge 52 to facilitate lubricant dispensing under the negative pressure generated by the pump 14. These goals are met admirably by the illustrated adapter 56 which includes as its major components an adapter body 74, a retainer 76, and a seal 78. Each of these components will now be detailed in turn.

The adapter body 74 is configured for attachment to the pump 14 and for cooperation with the retainer 76 and the seal 78 to sealingly clamp the storage cartridge 52 in place. The illustrated adapter body 74 has an upper, cup-shaped portion 80 and a lower, tubular portion 82. The upper portion 80 has 1) an upper internally threaded body 84 and 2) a lower annular end 86 that presents an upwardly facing annular surface 88 forming the first clamping surface of the adapter 56. The lower portion 82, which extends downwardly from the lower annular end 86 of the upper portion 80, is configured for connection to the pump 14, preferably by threading into a tapped counterbored portion of the inlet bore 42 as illustrated, so that an internal bore 90 of the lower 82 is axially aligned with the inlet 16 of the pump 14.

Figure 5:
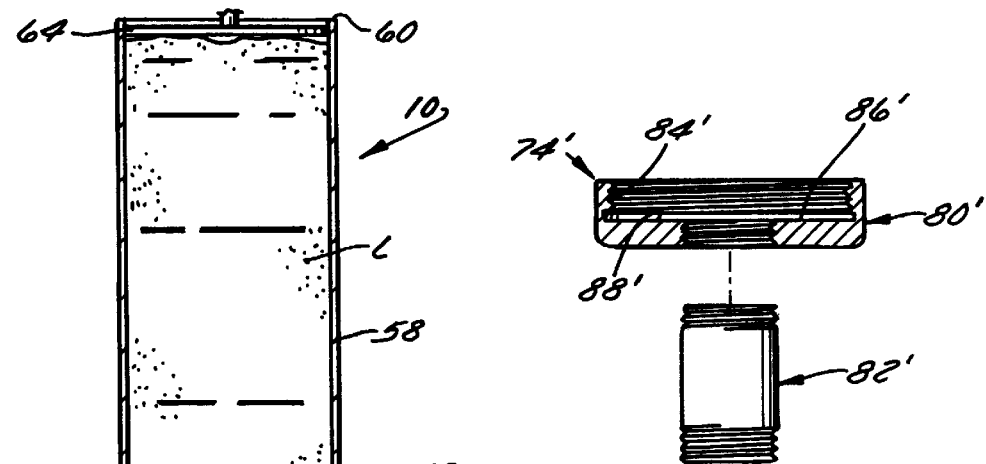
FIG. 5 is an exploded partially cut away elevation view of an adapter body of an adapter of a lubricant dispenser constructed in accordance with a second embodiment the present invention.

The lower, tubular portion 82 of the embodiment of FIGS. 1–4 is formed integrally with the upper, cup-shaped portion 80. Alternatively, a lower, tubular portion 82' could be threaded into or otherwise detachably connected to an upper, cup-shaped portion 80' as illustrated in FIG. 5, the adapter body 74' of which is otherwise identical to the adapter body 74 of FIGS. 1–4 and which, therefore, will not be described in greater detail.

The retainer 76 is configured to cooperate with the adapter body 74 so as to apply clamping forces to the bead 70 to clamp the storage cartridge 52 in place. Preferably, the retainer 76 is configured to clamp the bead 70 directly between the upwardly facing annular surface 88 of the adapter body 74 and a mating annular face of the retainer 76 that forms the second clamping surface of the adapter 56. In the illustrated embodiment, this effect is achieved by providing the retainer 76 in the form of a retaining ring at least a portion 92 of which is threaded along its outer peripheral surface so as to be threadable into the upper internally threaded body 84 of the upper portion 80 of the adapter body 74. As best seen in FIGS. 3 and 4, the retaining ring 76 and adapter body 74 are dimensioned and configured relative to one another and to the storage cartridge 52 and bead 70 such that, as the retaining ring 76 is screwed into the adapter body 74, a downwardly facing annular surface 94 of the retaining ring engages the upper end of the bead 70 and forces the bead 70 downwardly towards the upwardly facing annular surface 88 of the adapter body 74. This movement prevents axial movement of the storage cartridge 52 relative to the adapter 56 and, hence, prevents relative axial movement between the storage cartridge 52 and the pump 14.

The seal 78 may comprise any structure which forms an air-tight seal around the bottom opening of the storage cartridge 52 when the retaining ring 76 is threaded into the adapter body 74 to clamp the storage cartridge 52 in place. The seal 78 of the illustrated embodiment preferably comprises an elastomeric annular gasket which, as best seen in FIG. 4, is compressed between the bottom of the rim 72 and the upwardly facing annular surface 88 of the upper portion 80 of the adapter body 74 when the rim 72 is driven downwardly by the retaining ring 76, thereby forming the desired air-tight seal.

3. Operation of Lubricant Dispenser

In use, a lubricant storage cartridge 52 is mounted on the pump 14 in a very simple manner. First, the cap (not shown) is removed from the bottom end 62 of tubular body 58 using the pull tab or other suitable conventional device (also not shown) to leave an open bottom axial end 62 surrounded by a rim 72 that presents the bead 70. The retaining ring 76 also is slipped over the outer periphery of the tubular body 58 as illustrated in FIG. 2. The gasket 78 is then placed on the upwardly facing annular surface 88 of the adapter body 74, the cartridge 52 is inserted into the adapter body 74, and the retaining ring 76 is screwed into the adapter body 74 to sealingly clamp the storage cartridge 52 in position as seen in FIGS. 3 and 4.

The pump 14 is then actuated as described above to selectively deliver precisely-metered quantities of lubricant to downstream equipment. The negative pressure generated by the reciprocating pump piston 32 draws lubricant through the bottom axial outlet 62 of the storage cartridge 52, through the bore 90 in the adapter body 74, and into the inlet 16 of the pump 14. The air-tight seal provided by the gasket 78 and the bead 70 assures a maximum drawing or pumping effect due to the fact that air cannot bleed past the adapter 56 and into the pump inlet 16.

The follower disk 64 drops with the level of lubricant in the storage cartridge 52 as the lubricant is dispensed (compare FIGS. 1 and 2 with FIG. 3). The height of the position indicator 66 relative to the top of the tubular body 58 of the cartridge 52 therefore changes with the level of lubricant in the storage cartridge 52, thereby providing an indication of the lubricant level within the storage cartridge 52.

When the storage cartridge 52 is empty, it can be replaced simply by unscrewing the retaining ring 76 from the adapter body 74 and replacing the spent storage cartridge 52 with a new one. This replacement procedure is vastly simpler than prior, more complicated refilling procedures required with previously known metering devices.

4. Alternative embodiments

Many changes and modifications could be made to the invention without departing from the spirit thereof.

Figure 6:
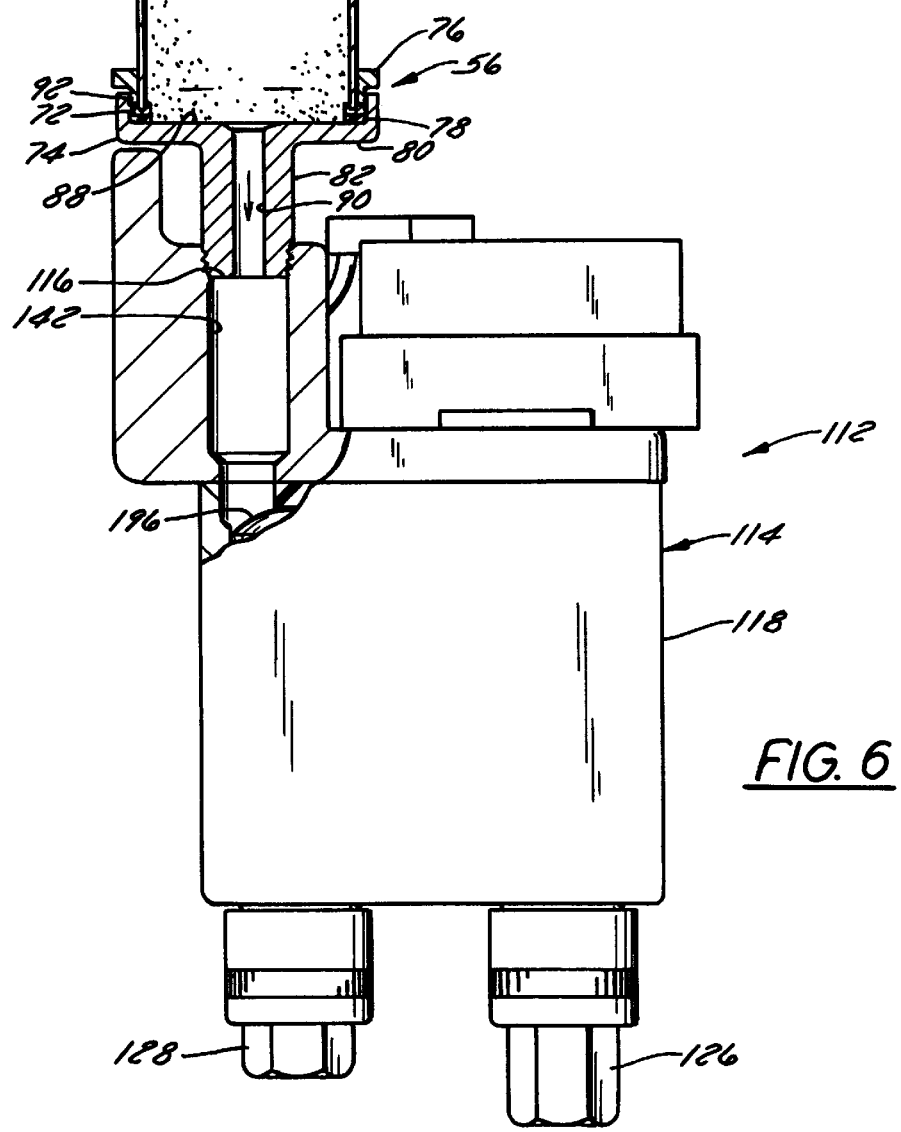
FIG. 6 is a partially cut away side elevation view of another lubricant metering device using the lubricant dispenser of the first embodiment of the invention.

For instance, the unitary adapter body 74 of FIGS. 1–4 could be replaced by the two-piece adapter body 74' of FIG. 5 as described above. Moreover, the metering device could take many different forms than the metering device 12 of FIG. 1 and could even be replaced by some other lubricant transfer device. For instance, the inventive adapter could be used in conjunction with the lubricant metering device 112 of FIG. 6, which is of the type illustrated in FIGS. 5 through 13 of the '595 application. Metering device 112 is of a two piston type as opposed to the three piston type of FIG. 1 and, accordingly, has an inlet 116 and only two outlets 126 and 128 formed in the housing 118 of the device's pump 114. In addition, rather than being driven pneumatically, its pistons are driven by a rotary cam 196 which, in turn, is driven by an electric synchronous motor or the like (not shown). Reciprocation of the pump pistons (not shown) under the power of the cam 196 1) draws lubricant into an inlet bore 142 of the pump housing 118 from the adapter 56 and the outlet of the storage cartridge 52 and 2) forces metered quantities of lubricant to the outlets 126 and 128.

Many other changes and modifications could be made to the invention without departing from the spirit thereof. The scope of these additional changes will become apparent from the appended claims.

I claim:

1. A lubricant metering device comprising:
   (A) a lubricant metering pump having a lubricant inlet and a lubricant outlet, said pump drawing lubricant into said lubricant inlet via a negative pressure;
   (B) a cylindrical lubricant storage cartridge having
      (1) a tubular body which has an upper axial end, a bottom axial end presenting an axial lubricant outlet, and a rim which is mounted on said bottom axial end and which presents a peripheral bead extending radially outwardly from said tubular body, and
      (2) a lubricant level indicator including a) a follower disk which slides axially downwardly within said tubular body as lubricant is dispensed from said lubricant outlet, and b) an indicator rod which is attached to said follower disk and which extends axially upwardly from said follower disk to a position beyond said upper end of said tubular body; and
   (C) an adapter including
      (1) an adapter body which is attached to said pump, said adapter body having
         (a) an upper cup-shaped portion having an upper internally threaded tubular portion and a lower annular end which presents an upwardly facing annular surface, and
         (b) a lower tubular portion which extends downwardly from said lower annular end of said cup-shaped portion and which is connected to said pump in the vicinity of said lubricant inlet of the pump,
      (2) a retaining ring which a) surrounds said tubular body of said storage cartridge, b) has a threaded outer peripheral surface which is screwed into said internally threaded tubular body of said cup-shaped portion of said adapter body, and c) has a downwardly facing annular surface which faces said upwardly facing annular surface of said adapter body when said retaining ring is attached to said adapter body, said downwardly facing annular surface of said retaining ring and said upwardly facing annular surface of said adapter body clamping said bead of said storage cartridge therebetween, thereby preventing relative axial movement between said storage cartridge and said pump, and (3) an annular gasket which is compressed between said upwardly facing annular surface of said adapter body and said rim and which provides an air-tight seal between said storage cartridge and said adapter body.

* * * * *